US011449310B2

(12) United States Patent
Huang et al.

(10) Patent No.: US 11,449,310 B2
(45) Date of Patent: Sep. 20, 2022

(54) RANDOM NUMBER GENERATOR, ENCRYPTION/DECRYPTION SECRET KEY GENERATOR AND METHOD BASED ON CHARACTERISTICS OF MEMORY CELLS

(71) Applicant: RAYMX Microelectronics Corp., Hefei (CN)

(72) Inventors: Shih-Fu Huang, Hefei (CN); Cheng-Yu Chen, Hefei (CN); Yi-Lin Hsieh, Hefei (CN); Jing-Long Xiao, Hefei (CN)

(73) Assignee: RAYMX MICROELECTRONICS CORP., Hefei (CN)

( * ) Notice: Subject to any disclaimer, the term of this patent is extended or adjusted under 35 U.S.C. 154(b) by 179 days.

(21) Appl. No.: 16/546,459

(22) Filed: Aug. 21, 2019

(65) Prior Publication Data

US 2020/0081689 A1    Mar. 12, 2020

Related U.S. Application Data

(63) Continuation-in-part of application No. 16/354,280, filed on Mar. 15, 2019, now Pat. No. 10,705,743.

(30) Foreign Application Priority Data

Sep. 7, 2018  (TW) ................... 107131621
Oct. 5, 2018  (TW) ................... 107135301

(51) Int. Cl.
*G06F 7/00*  (2006.01)
*G06F 7/58*  (2006.01)
*G06F 21/62*  (2013.01)
*G06F 3/06*  (2006.01)

(52) U.S. Cl.
CPC ............ *G06F 7/582* (2013.01); *G06F 3/0679* (2013.01); *G06F 21/62* (2013.01)

(58) Field of Classification Search
CPC ......... G06F 7/582; G06F 3/0679; G06F 21/62
See application file for complete search history.

(56) References Cited

U.S. PATENT DOCUMENTS

| | | | |
|---|---|---|---|
| 5,479,513 A * | 12/1995 | Protopopescu | H04L 9/001 380/259 |
| 8,761,403 B2 | 6/2014 | Su et al. | |
| 2016/0323096 A1 * | 11/2016 | Kara-Ivanov | H04L 9/0866 |
| 2018/0040356 A1 | 2/2018 | Hung et al. | |

* cited by examiner

*Primary Examiner* — Craig S Goldschmidt
(74) *Attorney, Agent, or Firm* — McClure, Qualey & Rodack, LLP (57) ABSTRACT

A method for generating a random number, applied in a random number generator coupled to a flash memory is disclosed. the method comprises: selecting a plurality of cells from the flash memory; initializing the selecting cells of the flash memory; programming the selecting cells to obtain a plurality of first potential values of the selecting cells; re-initializing the selecting cells of the flash memory; re-programming the selecting cells to obtain a plurality of second potential values of the selecting cells; and processing the first potential values and the second potential values according to a predetermined algorithm to generating the random number.

11 Claims, 6 Drawing Sheets

RANDOM NUMBER GENERATOR, ENCRYPTION/DECRYPTION SECRET KEY GENERATOR AND METHOD BASED ON CHARACTERISTICS OF MEMORY CELLS

CROSS-REFERENCE TO RELATED APPLICATION

This non-provisional application claims the benefit of priority under 35 U.S.C. § 119(a) to patent application Ser. No. 10/713,5301 in Taiwan, R.O.C. on Oct. 5, 2018, and is a Continuation-in-Part Application of U.S. patent application Ser. No. 16/354,280 on Mar. 15, 2019, which claims the benefit of priority to patent application Ser. No. 10/713,1621 in Taiwan, R.O.C. on Sep. 7, 2018; the entire contents of which are hereby incorporated by reference.

BACKGROUND

Technical Field

The present invention relates to a data storage device, and in particular, to an access method of a flash memory.

The present invention relates to a random number generator, and in particular, to the random number generator based on characteristics of memory cells.

Related Art

Data digitization is the current trend, and digital data can be permanently stored. Once digitalized, an important issue that has been identified is "data security." Conventional data encryption methods, such as HASH, SHA (Secure Hash Algorithm), SSL (Secure Socket Layer), WPA (Wi-Fi Protected Access), etc., are widely used in different fields. In the standard encryption program, the encryption and decryption method is easier to crack. Therefore, it is necessary to cooperate with the random number to increase the complexity and improve the security of the data.

As mentioned above, in order to provide a random number to improve data security, a True Random Number Generator (e.g., pseudo-random number generator) is required, which uses a constantly changing environment to generate different environmental variables. However, the complexity of the random number generated by the existing real random number generator is insufficient, and even if the above random number is used, the digitalized data is still cracked.

SUMMARY

In an embodiment, a method for generating a random number, applied in a random number generator coupled to a flash memory is disclosed. the method comprises: selecting a plurality of cells from the flash memory; initializing the selecting cells of the flash memory; programming the selecting cells to obtain a plurality of first potential values of the selecting cells; re-initializing the selecting cells of the flash memory; re-programing the selecting cells to obtain a plurality of second potential values of the selecting cells; and processing the first potential values and the second potential values according to a predetermined algorithm to generating the random number.

In an embodiment, an apparatus for generating a random number is disclosed. The apparatus includes: a circuit coupled to a flash memory and configured to select a plurality of cells from the flash memory; initialize the selecting cells of the flash memory; program the selecting cells to obtain a plurality of first potential values of the selecting cells; re-initialize the selecting cells of the flash memory; re-program the selecting cells to obtain a plurality of second potential values of the selecting cells; and process the first potential values and the second potential values according to a predetermined algorithm to generating the random number, wherein at least one of the first and the second potential values is different, and each of the first and the second potential values corresponds to a characteristic of each selected cell in the flash memory.

These and other objectives of the present invention will no doubt become obvious to those of ordinary skill in the art after reading the following detailed description of the preferred embodiment that is illustrated in the various figures and drawings.

After referring to the following embodiments, those having ordinary knowledge in the technical field of the present invention can easily understand the basic spirit and other object of the present invention, as well as the technical means and implementation manners used in the present invention.

BRIEF DESCRIPTION OF THE DRAWINGS

The present invention will become more fully understood from the detailed description given herein below for illustration only, and thus are not limitative of the present invention, and wherein.

The various features and elements in the figures are not drawn to scale, and are in the form of the preferred embodiments. In addition, similar elements/components are referred to by the same or similar element symbols throughout the different drawings.

DETAILED DESCRIPTION

The term "couple" or "connect" used in this specification may mean that two or more components are mutually directly used as entities or in electrical contact, or are mutually indirectly used as entities or in electrical contact. The term "couple" or "connect" may also mean that two or more components mutually operate or act.

Unless otherwise defined in this specification, the meaning of the scientific and technical terms used herein is the same as that of ordinary skill in the art to which the invention pertains. In addition, the singular noun used in this specification covers the plural of the noun in the case of no conflict with the context; the plural noun of the noun is also included in the plural noun used.

Figure 1:
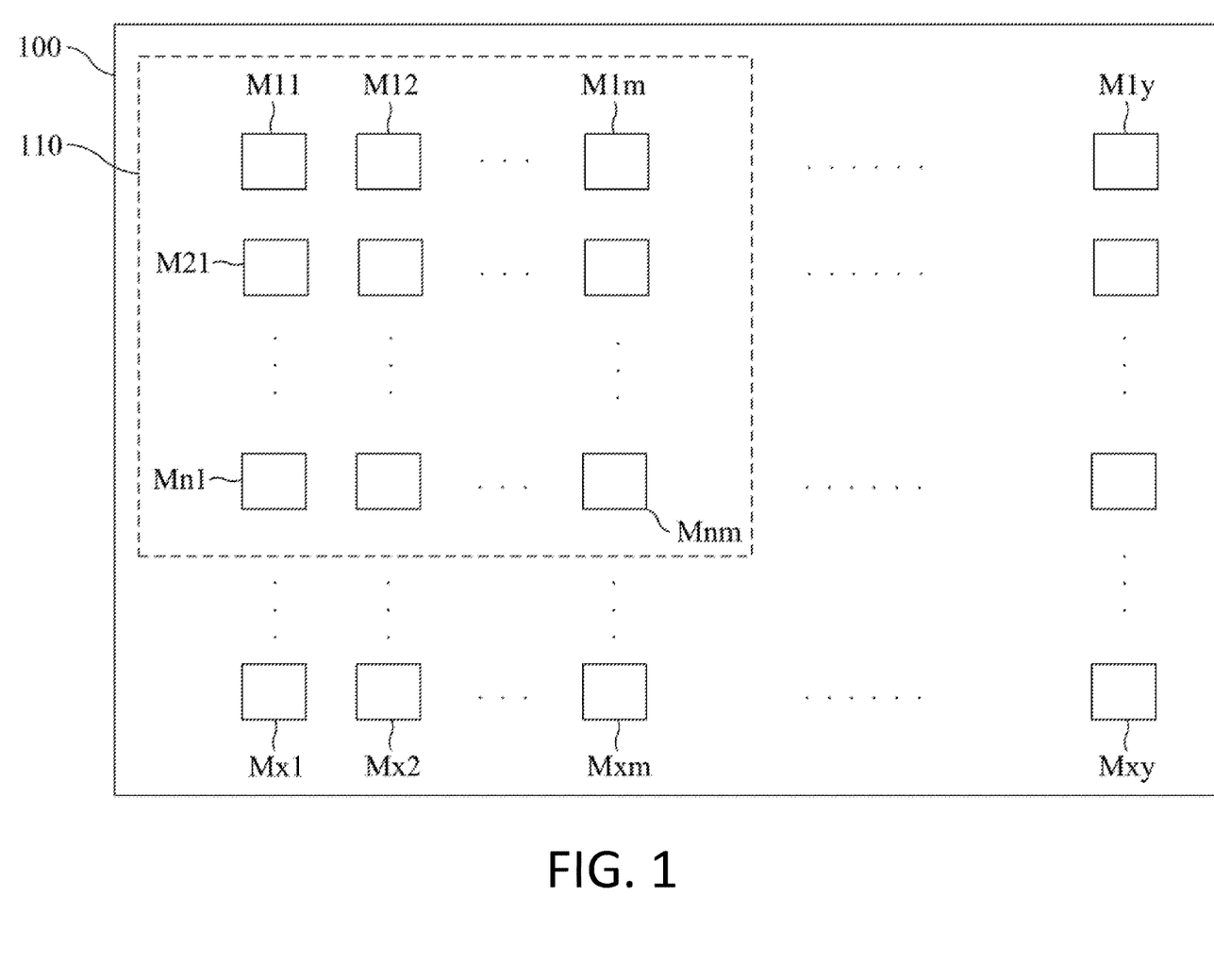
FIG. 1 is a schematic diagram showing an array of NAND memory according to an embodiment of the present invention.

FIG. 1 is a schematic diagram showing an array of Flash memory according to an embodiment of the present invention. As shown, the flash memory 100 (e.g., NAND Memory) includes a plurality of memory cells M11~Mxy, both of which are positive integers. To illustrate how to use the physical characteristics of the flash memory 100 to generate a random number, please refer to FIG. 2, which is a flowchart of a random number generation method 200 according to an embodiment of the present invention.

Figure 2:
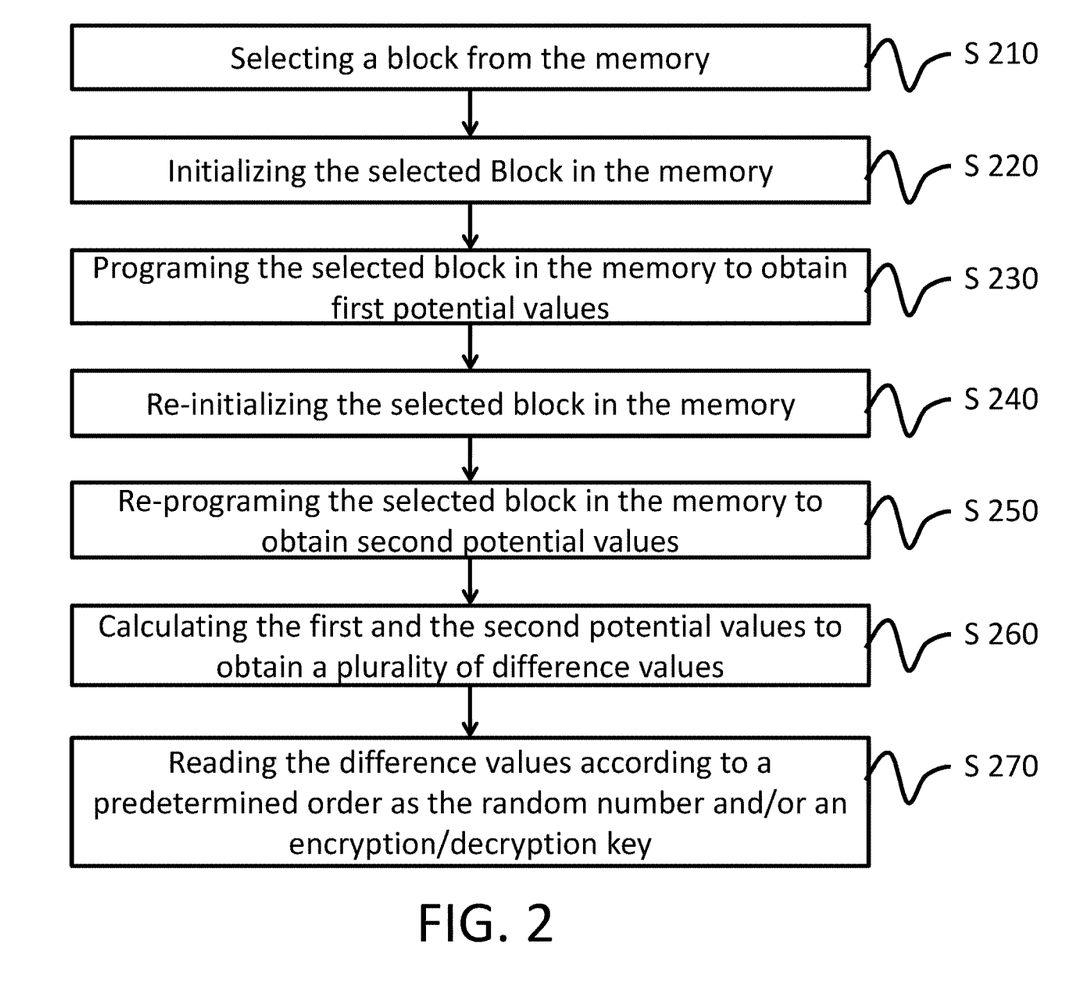
FIG. 2 is a flow chart showing a method for generating a random number, an encryption and decryption key according to an embodiment of the present invention.

First, please refer to FIG. 2, the random number generation method 200 includes the following steps:

STEP 210: selecting at least one of a plurality of blocks in the flash memory;

STEP 220: Initializing the at least one block 110 of the flash memory;

STEP 230: programming the block of the flash memory to obtain a plurality of first potential values of the plurality of cells in the block; wherein the first potential values are temporarily stored in a first table;

STEP 240: Re-initializing the block of the flash memory;

STEP 250: re-programming the blocks of the flash memory to obtain a plurality of second potential values of the same cells in the block; lock; wherein the second potential values are temporarily stored in a second table;

STEP 260: calculating (e.g., subtracting, adding . . . etc.) the first potential values of the cells from the second potential values of the cells to obtain a calculated (e.g., difference, added) table;

STEP 270: Reading the plurality of difference values from the calculated table according to a predetermined order as the random number. In STEP 270 further includes obtaining an encryption/decryption key according to the random number. In an embodiment, the above steps are implemented by a memory controller that can access the flash memory.

Please refer to FIG. 1 and FIG. 2 together for explanation. In STEP 210, the block 110 of the flash memory 100 is selected. However, the present invention is not limited to the one shown in FIG. 1, which is merely used to illustrate one of the implementations of the present invention. In other embodiments, other portions of the flash memory 100 may also be selected as blocks, such as selecting the lower left corner portion, the upper right corner portion, the lower right corner portion, the middle portion of the flash memory 100, or a remaining appropriate portions, as such, when the different parts of the flash memory 100 are selected as the above block, the complexity of the subsequent encryption and decryption keys is further enhanced. In other embodiment, the block 110 of the flash memory 100 is selected based on the results of the pre-test in the flash memory 100.

Figure 3:
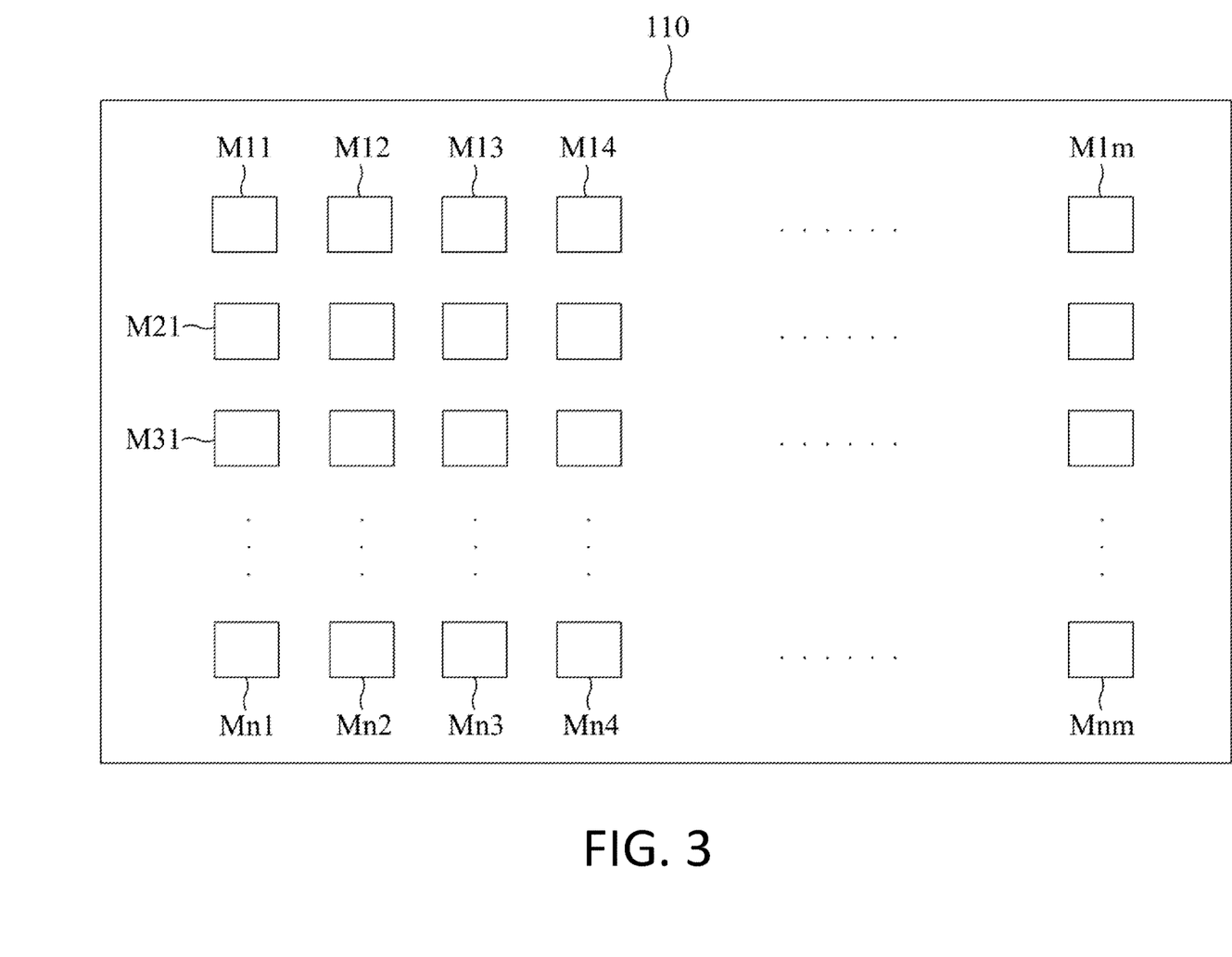
FIG. 3 is a schematic diagram showing a block diagram of a portion of the NAND memory as shown in FIG. 1 according to an embodiment of the present invention.

In STEP 220, please refer to FIG. 3 for explanation. FIG. 3 is a Schematic diagram of block 110 in the flash memory 100 as shown in FIG. 1 according to an embodiment of the present invention. As shown, the block 110 of the flash memory 100 includes a plurality of memory cells $M_{11}$~$M_{nm}$, and n and in are positive integers. As shown in STEP 220, the block 110 of the flash memory 100 is initialized. For example, the initialization in STEP 220 may be performed by erasing the data of the cells $M_{11}$ to $M_{nm}$ in the block 110 of the flash memory 100.

Figure 4:
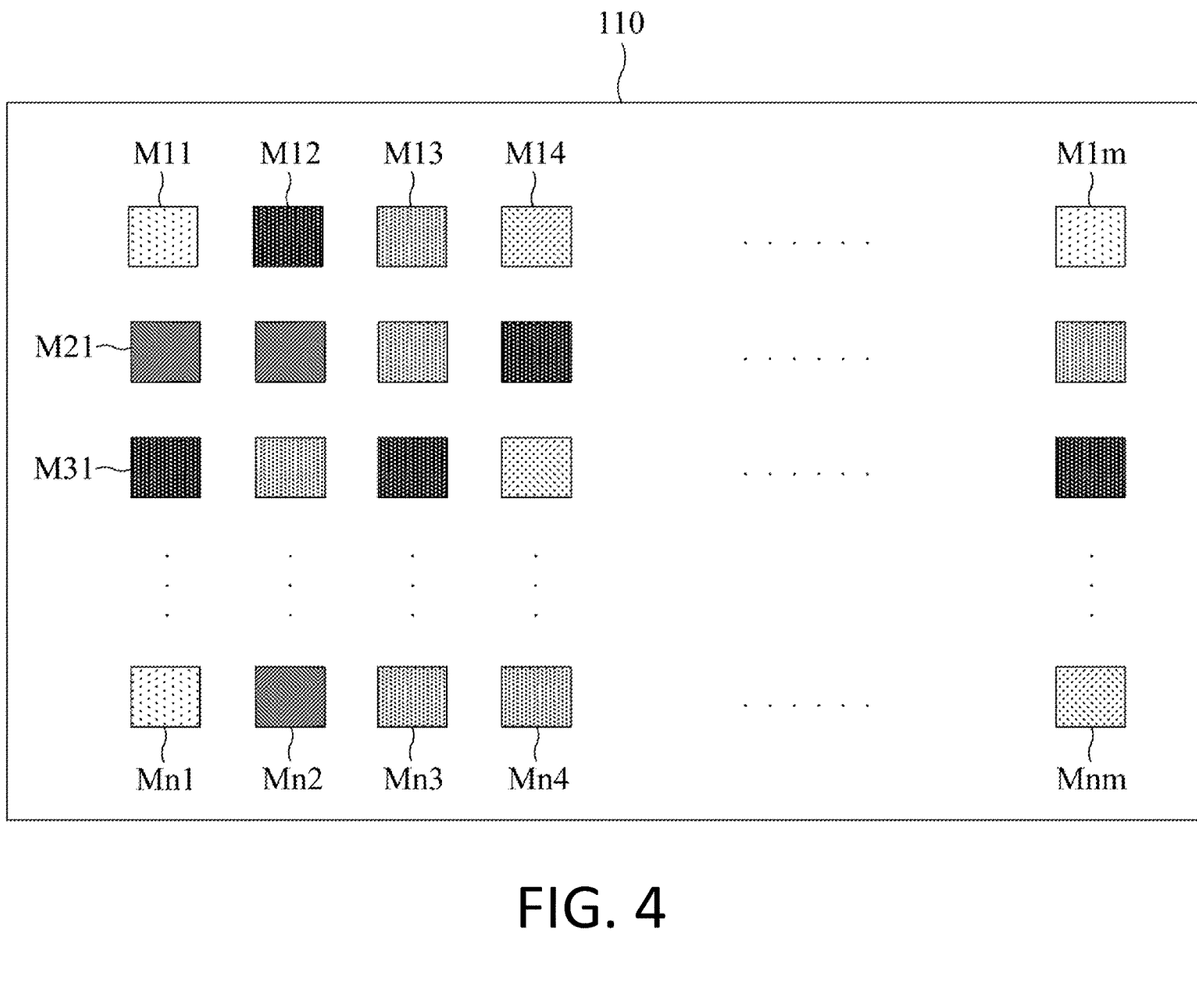
FIG. 4 is a schematic diagram showing the first program operation in the block diagram of a portion of the NAND memory as shown in FIG. 3 according to an embodiment of the present invention.

Next, please refer to STEP 230 and FIG. 4 for explanation. FIG. 4 is a schematic diagram showing a first program operation in the block of the Flash memory as shown in FIG. 3 according to an embodiment of the present invention. As shown in STEP 230, the block 110 of the flash memory 100 is programmed to obtain a plurality of first potential values of the cells M11 to Mnm in the block 110. For example, the above programing operation may be to write (or provide) a high potential to the memory cells M11 to Mnm in the block 110 of the flash memory 100. Please refer to FIG. 4, which shows the potential value of stored in the memory cells M11~Mnm in a dot matrix, wherein the denser the dot matrix, the higher the potential value. It should be noted that due to slight differences in materials, processes, etc., in general, the characteristics of each memory cell M11~Mnm will be different, so even if the same high potential is applied to the memory cells M11~Mnm, the potential values (that is, the number of electric charge) which are stored in the memory cells M11~Mnm are still different.

Figure 5:
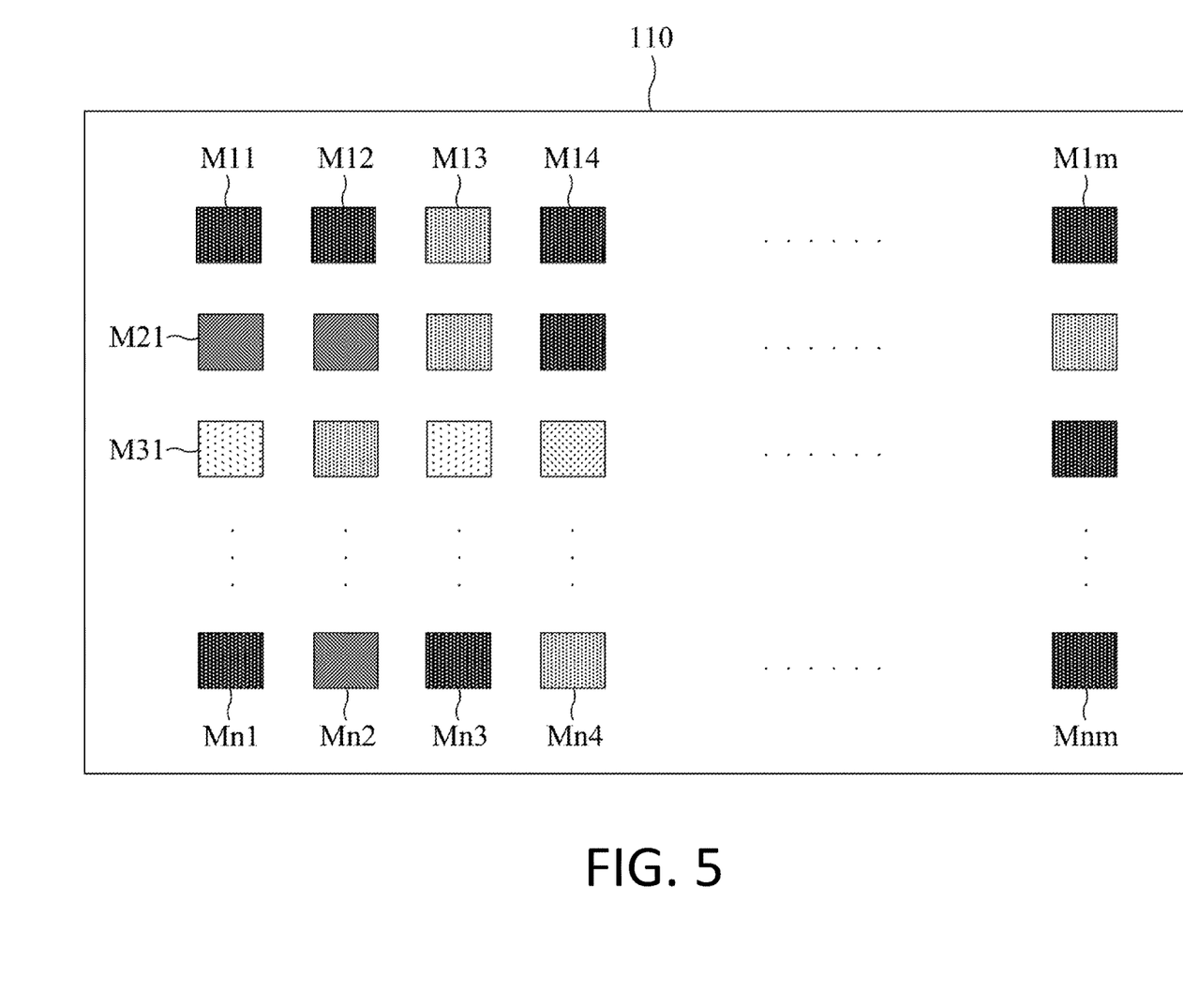
FIG. 5 is a schematic diagram showing the second program operation in the block diagram of the NAND memory as shown in FIG. 3 according to an embodiment of the present invention.

Referring to STEP 240, the block 110 of the flash memory 100 is re-initialized, for example, data in the memory cells $M_{11}$~$M_{nm}$ in the block 110 of the flash memory 100 are re-erased/re-erased. Then, STEP 250 is performed. FIG. 5 illustrates a second program operation in the block 110 of the flash memory 100 as shown in FIG. 3 according to an embodiment of the present invention. As shown in STEP 250, the block 110 of the flash memory 100 is re-/re-programmed to obtain a plurality of second potential values of the memory cells $M_{11}$-$M_{nm}$ in the block 110. For example, the above second program operation may be to write a high potential to the memory cells $M_{11}$ to $M_{nm}$ in the block 110 of the flash memory 100. As shown in FIG. 5, after the high potential is written, the second potential values of the memory cells $M_{11}$ to $M_{nm}$ are different in STEP 250. The first potential values (in STEP 230) and the second potential values (in STEP 250) of the memory cells $M_{11}$ to $M_{nm}$ are different.

Figure 6:
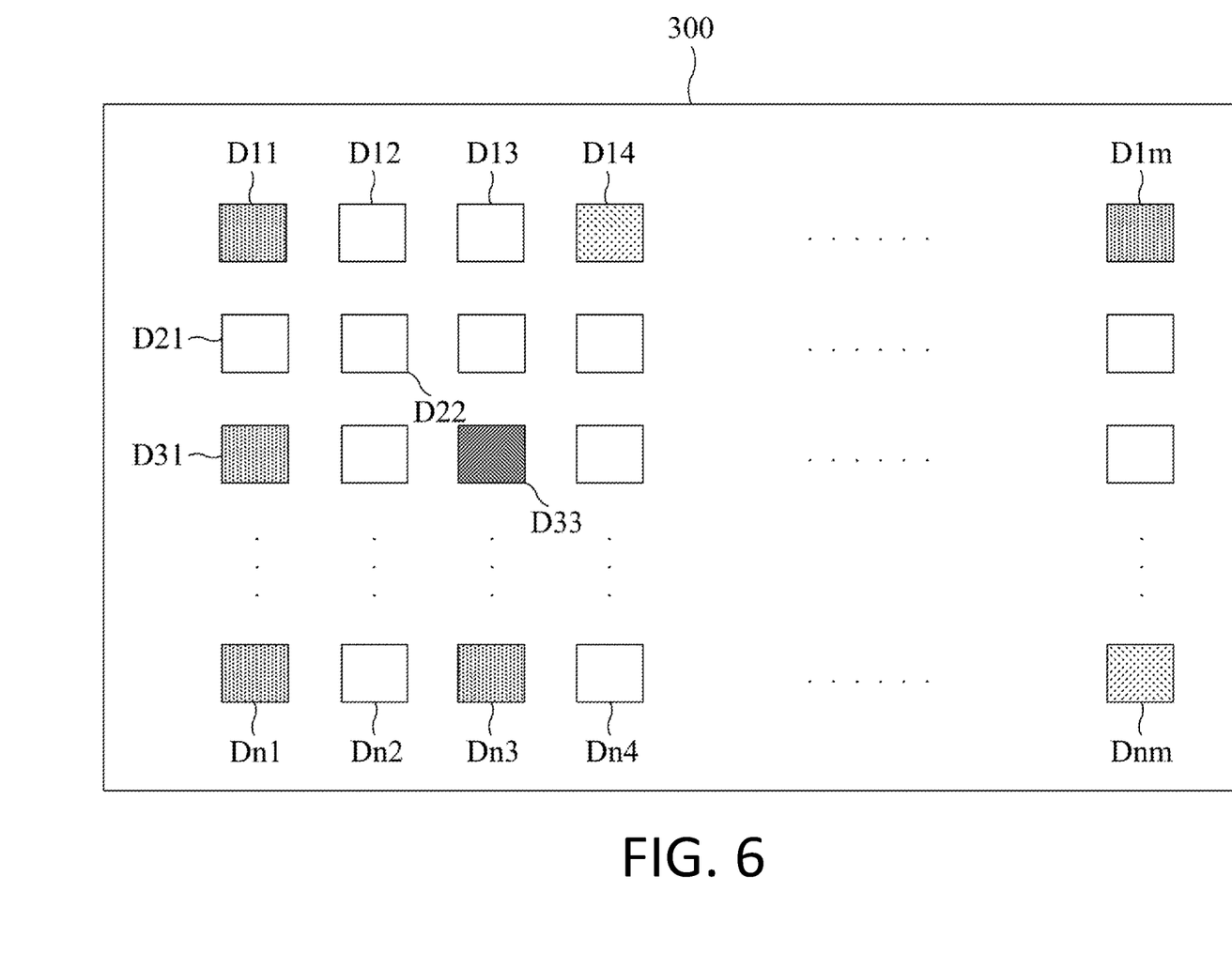
FIG. 6 is a schematic diagram showing the difference value of the NAND memory as shown in FIG. 3 according to an embodiment of the present invention.

In STEP 260, the first potential values of the cells from the second potential values of the cells are calculated to obtain a calculated table. In an embodiment, the first potential values of the memory cells $M_{11}$-$M_{nm}$ are correspondingly subtracted from the second potentials to obtain a difference table. For example, the first potential values of the memory cells $M_{11}$ to $M_{nm}$ shown in FIG. 4 are subtracted from the second potential values of the corresponding memory cells $M_{11}$ to $M_{nm}$ in FIG. 5 to obtain the difference table 300 shown in FIG. 6. In detail, by subtracting the second potential values of the corresponding memory cell $M_{11}$ of FIG. 5 from the first potential values of the memory cell $M_{11}$ of FIG. 4, the difference value D11 shown in FIG. 6 is obtained, and the remaining memory cells can also be used in the above manner to obtain the difference value. If all the difference values of cells $M_{11}$ to $M_{nm}$ are gathered, the difference table 300 shown in FIG. 6 can be obtained. It should be noted that not all memory cells will exhibit different potential value when they are programmed twice, such as memory cell $M_{12}$, which has the same potential value after two programmed, so there is no difference value D12 (there is no difference value, which is indicated here in white, but the embodiment of FIG. 6 is for illustration only, and is not limited to this invention).

Subsequently, in STEP 270, reading the plurality of difference values in the difference table 300 in the predetermined order as the random number (or the encryption and decryption key). For example, if the difference value D11 is 255 and the difference value D14 is 127, the random number (or the encryption and decryption key) is 255127. However, this invention is not limited to this, and it only exemplarily illustrates one of the implementation methods of the present invention and is helpful for understanding. There are still many difference values in the difference table 300. If these difference values are combined into the above-mentioned the random number or the encryption and decryption key. The complexity of the number (key) is very high, and it is safe for encryption and decryption.

In an embodiment, the matrix formed by the block 110 of FIG. 3 to FIG. 5 or the matrix unit formed by one row and one column of the matrix formed by the difference value of FIG. 6 may be used as a basic unit. In FIG. 6, the difference value D12 is a matrix unit, which occupies a basic unit of the matrix, and the difference value D13 is also a matrix unit, which occupies a basic unit of the matrix. The encryption and decryption key in this embodiment can further increase the complexity according to the above situation. For example, except that the difference value D11 is 255 and the difference value D14 is 127, because the difference value D11 and the difference value D14 are separated by two basic units (such as D12, D13). Therefore, the encryption and decryption key can be formed by the combination of the difference value and the basic unit. In detail, the encryption and decryption key can be "the difference value D11, the basic unit 2 between the difference values (such as D12, D13) And the combination of the difference value D14", that is, the encryption and decryption key can be 2552127. The difference table 300 has a number of difference values and basic units of the difference between the difference values. If the combination of these difference values and the basic unit is used as the above-mentioned random number and /or encryption/decryption key. The complexity of the number (or key) will be further improved, and the security of encryption and decryption is more secure.

In another embodiment, the predetermined order of the difference values in the read difference table described in STEP 270 may be: selectively reading the difference values corresponding to the same row of the matrix in the difference table 300; selectively reading the difference values corresponding to the same column of the matrix in the difference table 300; or selectively reading the difference values corresponding to any row and any column of the matrix of the difference table 300 and the read difference values are combined with the values of the basic units as the random number or the encryption and decryption key.

Referring to FIG. 6, the same column of the matrix is read as an example, which can read the difference value D11, the basic unit 2 (D12, D13), and the difference value D14. Therefore, the encryption and decryption key is 2552127. The same row of the matrix is read as an example, which can read the difference value D11, the basic unit 1 (D21), and the difference value D31. If the difference value D31 is 268, the encryption and decryption key is 2551268. Taking any row and any column of the matrix in the reading order as an example, it can read the data on the oblique line of the difference table, such as reading the difference value D11, the basic unit 1 (D22), and the difference value D33, if the difference value D33 is 525, at this time, the available encryption and decryption key is 2551515. Similarly, the invention is not limited to this case. The difference table 300 has a plurality of difference values and basic units spaced between the difference values. If the combination of the difference values and the basic unit is used as the encryption and decryption key, the encryption and decryption are performed. The complexity of the key can be further improved, and the security of encryption and decryption is more secure. In addition, the predetermined order of the difference values in the reading difference table described in STEP 270 is not limited to the above embodiment, and may be read at intervals between different difference values when reading, for example, a difference value having a difference For D11, D14, D16, D18, D19, the case can read the difference values D11, D16, D19 at intervals, skip the difference values D14, D18, or the case can also read the even difference values D14, D18, or set any required reading order.

In another embodiment, a range may be set for the difference value, for example, the range of the difference value is set to 128 to 256. If the difference value not in the range is to be filtered out, the complexity of the encryption and decryption keys are further enhanced. For example, taking the same column in which the reading order is a matrix as an example, the difference value D11, the basic unit 2 (D12, D13), and the difference value D14 can be read originally. However, the difference value D14 is 127, which exceeds the range of the difference value. 128256, therefore, the difference value D14 will not be read, but will continue to find the difference value of the remaining bits in the range of difference values in the same column. After the 500 basic units have passed, the difference value D1502 is 152 (The above D1502 is the first column and the 502th line). Then, after 50 basic units have passed, the difference value D1553 is found to be 198 (the above D1553 is the first column and the 553th line), then the combination of the above difference value and basic units is 25550015250198 as the encryption and decryption key, the detailed list is as follows:

| 255 | 500 | 152 | 50 | 198 |
|---|---|---|---|---|
| D11 | 500 basic units | D1502 | 50 basic units | D1553 |

In this way, when the complexity of the encryption and decryption key (the random number) can be increased again, the security of encryption and decryption is improved. It should be noted that the STEPs 3-6 may be performed by an electronic device or other suitable devices. For example, it can be executed by a central processing unit (CPU), a microprocessor (MCU), a controller, an Application-specific integrated circuit (ASIC) and/or other suitable components of the electronic device.

In conclusion, according to the technical content of the present invention, the random number or/and encryption/decryption key generation method shown in the embodiment of the present invention utilizes the difference value generated by the physical characteristics of the NAND memory to generate a random number or/and an encryption/decryption key to enhance the complexity of the random number or/and the decryption key. In addition, embodiments of the present invention also use different read orders and/or different limit value ranges to filter out partial differences to increase the complexity of the random number or/and the encryption/decryption key generated in this embodiment of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a pseudo-random number, applied in a pseudo-random number generator coupled to a flash memory, the method comprising:
selecting a plurality of cells from the flash memory;
initializing each of the selected cells of the flash memory;
programming a first constant voltage value into each of the selected cells, wherein after the programming, each of the selected cells contains a respective first actual voltage value, wherein at least one of the respective first actual voltage values is different from at least one other one of the respective first actual voltage values;

re-initializing each of the selected cells of the flash memory;

re-programming a second constant voltage value into each of the selected cells wherein after the programing, each of the selected cells contains a respective second actual voltage value, wherein at least one of the respective second actual voltage values is different from at least one other one of the respective second actual voltage values; and for each respective cell, computing a respective difference value comprising a voltage difference between the respective first actual voltage value and the respective second actual voltage value, wherein at least one of the respective difference values is different from at least one other one of the respective difference values;

generating the pseudo-random number by combining the plurality of the difference values according to a predetermined algorithm.

2. The method of claim 1, wherein the step of programing the selected cells to obtain the plurality of first values further comprises:

providing a high-level voltage to each of the selected cells; and obtaining each of the first actual voltage values according to a potential stored in the corresponding selected cell.

3. The method of claim 1, further comprising:

obtaining an encryption/decryption key according to the pseudo-random number.

4. The method of claim 1, wherein the step of computing each respective difference value comprises:

subtracting each first actual voltage value from the respective second actual voltage value of a corresponding cell to obtain a difference table containing a plurality of difference values;

wherein the step of combining the plurality of the difference values according to the predetermined algorithm comprises:

retrieving a plurality of difference values from the difference table in a predetermined order to generate the pseudo-random number.

5. The method of claim 4, wherein retrieving the difference values in the difference table further comprises:

determining a subset of difference values from the plurality of difference values;

retrieving difference values from the difference table according to the subset of difference values and the predetermined order to generate the pseudo-random number.

6. The method of claim 1, wherein the pseudo-random number generator is applied an encryption/decryption key generator.

7. An apparatus for generating a pseudo-random number, the apparatus comprising:

a flash memory; and a circuit, coupled to the flash memory, configured to:

select a plurality of cells from the flash memory;

initialize each of the selected cells of the flash memory;

program a first constant voltage value into each of the selected cells, wherein after the programing, each of the selected cells contains a respective first actual voltage value, wherein at least one of the respective first actual voltage values is different from at least one other one of the respective first actual voltage values;

re-initialize each of the selected cells of the flash memory;

re-program a second constant voltage value into each of the selected cells wherein after the programing, each of the selected cells contains a respective second actual voltage value, wherein at least one of the respective second actual voltage values is different from at least one other one of the respective second actual voltage values; and for each respective cell, compute a respective difference value comprising a voltage difference between the respective first actual voltage value and the respective second actual voltage value, wherein at least one of the respective difference values is different from at least one other one of the respective difference values;

generate the pseudo-random number by combining the plurality of the difference values according to a predetermined algorithm.

8. The apparatus of claim 7, wherein an encryption/decryption key is obtained according to the pseudo-random number.

9. The apparatus of claim 7, wherein the selected cells are programmed by providing a high-level voltage to each of the selected cells; and wherein the respective first actual voltage values are measured values of each respective one of the selected cells.

10. The apparatus of claim 7, wherein the predetermined algorithm comprises:

subtracting each first actual voltage value from a respective second actual voltage value of a corresponding cell to obtain a difference table containing a plurality of difference values;

retrieving a plurality of difference values from the difference table in a predetermined order to generate the pseudo-random number.

11. The apparatus of claim 7, wherein the apparatus is applied in an encryption/decryption key generator.

* * * * *